(12) United States Patent
Li et al.

(10) Patent No.: US 10,936,113 B2
(45) Date of Patent: Mar. 2, 2021

(54) INPUT CONTROL CIRCUIT AND METHOD, INPUT CONTROL DEVICE, DISPLAY PANEL

(71) Applicants: Beijing BOE Display Technology Co., Ltd., Beijing (CN); BOE TECHNOLOGY GROUP CO., LTD., Beijing (CN)

(72) Inventors: Feng Li, Beijing (CN); Yu Ma, Beijing (CN); Qi Sang, Beijing (CN); Jing Wang, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/458,310

(22) Filed: Jul. 1, 2019

(65) Prior Publication Data

US 2020/0150818 A1    May 14, 2020

(30) Foreign Application Priority Data

Nov. 12, 2018 (CN) .......................... 201811340689.7

(51) Int. Cl.
*G06F 3/041* (2006.01)
*G09G 3/3208* (2016.01)
*G09G 3/36* (2006.01)

(52) U.S. Cl.
CPC ......... *G06F 3/0416* (2013.01); *G09G 3/3208* (2013.01); *G09G 3/36* (2013.01)

(58) Field of Classification Search
None
See application file for complete search history.

(56) References Cited

U.S. PATENT DOCUMENTS

| | | | |
|---|---|---|---|
| 5,392,058 A * | 2/1995 | Tagawa ................ | B25J 19/0012 345/103 |
| 7,907,113 B2 * | 3/2011 | Jang ..................... | G09G 3/3607 345/100 |

(Continued)

FOREIGN PATENT DOCUMENTS

| | | |
|---|---|---|
| CN | 106448590 A | 2/2017 |
| CN | 107256692 A | 10/2017 |
| CN | 107731187 A | 2/2018 |

OTHER PUBLICATIONS

Definition of subcircuit downloaded from https://en.wiktionary.org/wiki/subcircuit May 8, 2020 (Year: 2020).*

(Continued)

*Primary Examiner* — Dorothy Harris
(74) *Attorney, Agent, or Firm* — Thomas|Horstemeyer, LLP (57) ABSTRACT

The present disclosure relates to the field of display technology and, in particular, to an input control circuit and an input control circuit method; an input control device; and a display panel. The input control circuit includes an input module configured to transmit an input signal to the pull up node in response to the input signal; an output module configured to transmit a clock signal to the signal output terminal in response to a voltage signal at the pull up node; a driving module configured to transmit a common signal to the common electrode block in response to the voltage signal at the pull up node; a reset module configured to transmit a power signal to the pull up node in response to a reset signal; and a bootstrap capacitor connected between the pull up node and the signal output terminal.

12 Claims, 5 Drawing Sheets

(56) References Cited

U.S. PATENT DOCUMENTS

| | | | |
|---|---|---|---|
| 2006/0201931 A1* | 9/2006 | Lee | G09G 3/3648 |
| | | | 219/497 |
| 2008/0211760 A1* | 9/2008 | Baek | G11C 19/184 |
| | | | 345/98 |
| 2012/0105396 A1* | 5/2012 | Sakamoto | G11C 19/28 |
| | | | 345/204 |
| 2016/0195972 A1* | 7/2016 | Chen | G02F 1/13338 |
| | | | 345/173 |
| 2016/0266699 A1* | 9/2016 | Zhao | G06F 3/044 |
| 2016/0300542 A1* | 10/2016 | Zhang | G09G 3/3266 |
| 2016/0370918 A1* | 12/2016 | Huang | G06F 3/044 |
| 2017/0010731 A1* | 1/2017 | Zhang | G09G 3/3677 |
| 2017/0186773 A1* | 6/2017 | Fan | G06F 3/0412 |

OTHER PUBLICATIONS

First Office Action for CN Patent Application No. 201811340689.7 dated Jan. 22, 2021.

\* cited by examiner

INPUT CONTROL CIRCUIT AND METHOD, INPUT CONTROL DEVICE, DISPLAY PANEL

CROSS-REFERENCE TO RELATED APPLICATION

The present application is based upon, claims the benefit of, and claims priority to Chinese Patent Application No. 201811340689.7, filed on Nov. 12, 2018, the entire disclosure of which being hereby incorporated by reference as a part of the present application.

TECHNICAL FIELD

The present disclosure relates to the field of display technology and, more particularly, to an input control circuit and an input control method, an input control device, and a display panel.

BACKGROUND

With the development of optical and semiconductor technology, flat panel displays, generally represented by liquid crystal displays (LCDs) and organic light emitting diodes (OLEDs), have dominated the display field due to their various characteristics, such as having light and thin volume, low power consumption, fast response, good color purity, and high contrast.

In-Cell Touch refers to technology where a touch structure is embedded into a display panel. In such technology, a common electrode is usually multiplexed as a touch electrode, so that the common electrode is divided into a plurality of common electrode blocks and, in addition, a common signal is input through a switching transistor and a touch lead.

It should be noted that the information disclosed in the Background section above is only for enhancement of understanding of the background of the present disclosure and thus, may include information that does not constitute prior art known to those of ordinary skill in the art.

SUMMARY

An objective of the present disclosure is to provide an input control circuit, an input control method, an input control device, and a display panel.

According to an aspect of the present disclosure, an input control circuit is provided, including:

an input module connected to a signal input terminal and a pull up node, configured to transmit an input signal to the pull up node in response to the input signal;

an output module connected to the pull up node, a clock signal terminal, and a signal output terminal, and configured to transmit a clock signal to the signal output terminal in response to a voltage signal at the pull up node;

a driving module connected to the pull up node, a common signal terminal, and a common electrode block, and configured to transmit a common signal to the common electrode block in response to a voltage signal at the pull up node;

a reset module connected to the pull up node, a power signal terminal, and a reset signal terminal, and configured to transmit a power signal to the pull up node in response to a reset signal; and a bootstrap capacitor connected between the pull up node and the signal output terminal.

In an exemplary embodiment of the present disclosure, the input module includes:

a first switching element having a control terminal and a first terminal both connected to the signal input terminal, and a second terminal connected to the pull up node.

In an exemplary embodiment of the present disclosure, the output module includes:

a second switching element having a control terminal connected to the pull up node, a first terminal connected to the clock signal terminal, and a second terminal connected to the signal output terminal.

In an exemplary embodiment of the present disclosure, the driving module includes:

a third switching element having a control terminal connected to the pull up node, a first terminal connected to the common signal terminal, and a second terminal connected to the common electrode block.

In an exemplary embodiment of the present disclosure, the reset module includes:

a fourth switching element having a control terminal connected to the reset signal terminal, a first terminal connected to the power signal terminal, and a second terminal connected to the pull up node.

In an exemplary embodiment of the present disclosure, the input control circuit further includes:

an isolation module connected to an isolation signal terminal, the power signal terminal, and the pull up node, and configured to transmit the power signal to the pull up node in response to the isolation signal.

In an exemplary embodiment of the present disclosure, the isolation module includes:

a fifth switching element having a control terminal connected to the isolated signal terminal, a first terminal connected to the power signal terminal, and a second terminal connected to the pull up node.

According to an aspect of the present disclosure, an input control method is provided, applied to the input control circuit of any of those described above. The method includes:

controlling the input module to transmit an input signal to the pull up node in response to the input signal, thereby causing the output module to transmit a clock signal to the signal output terminal and causing the driving module to transmit a common signal to the common electrode block in a first saturated state;

pulling up the signal at the pull up node under the bootstrap effect of the bootstrap capacitor, and causing the driving module to transmit the common signal to the common electrode block in a second saturated state; and controlling the reset module to transmit a power signal to the pull up node to reset the pull up node in response to a reset signal.

According to an aspect of the present disclosure, an input control device is provided, including: a plurality of input control circuit groups; each of the input control circuit groups including a plurality of cascaded input control circuits according to any one of those described above, wherein the signal output terminal of a Nth stage input control circuit is connected to the signal input terminal of a (N+2)th stage input control circuit, and the signal output terminal of the (N+2)th stage input control circuit is connected to the reset signal terminal of the Nth stage input control circuit; where N is an integer and N≥1.

According to an aspect of the present disclosure, a display panel is provided, including: the input control device according to any of the above; and a plurality of common electrode blocks arranged in an array; wherein each of the input control circuit groups corresponds to a row of the common electrode blocks, and each input control circuit in the input control circuit group is respectively connected to each of the common electrode blocks of the row.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure. Understandably, the drawings in the following description are only some of the embodiments of the present disclosure, and other drawings may be obtained from these drawings by those skilled in the art without any creative effort.

DETAILED DESCRIPTION

Exemplary embodiments will now be described more fully with reference to the accompanying drawings. However, the exemplary embodiments can be embodied in a variety of forms and should not be construed as being limited to the examples set forth herein. Rather, these embodiments are provided so that this disclosure will be more thorough and complete, and to fully convey the concept of the exemplary embodiment to those skilled in the art. The described features, structures, or characteristics may be combined in any suitable manner in one or more embodiments.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily have to correspond to separate entities, whether physically or logically. These functional entities may be implemented in software, or in one or more hardware modules or integrated circuits, or in different network and/or processor devices and/or microcontroller devices.

In a comparative embodiment of the present disclosure, after a common electrode is divided into a plurality of common electrode blocks, a common signal has to be input through a switching transistor and a touch lead, which may result in an increase in the overall impedance. In addition, there is a parasitic capacitance between a gate scan line and the common electrode block. During a charging process of a pixel, a signal may hop on the gate scan line and may cause the signal on the common electrode block to fluctuate due to the capacitive coupling. In this case, since the overall impedance of the common electrode is large, signal fluctuation on the common electrode block cannot be recovered in time, resulting in display abnormalities, such as horizontal stripes occurring during a Cell Test (CT).

Figure 1:
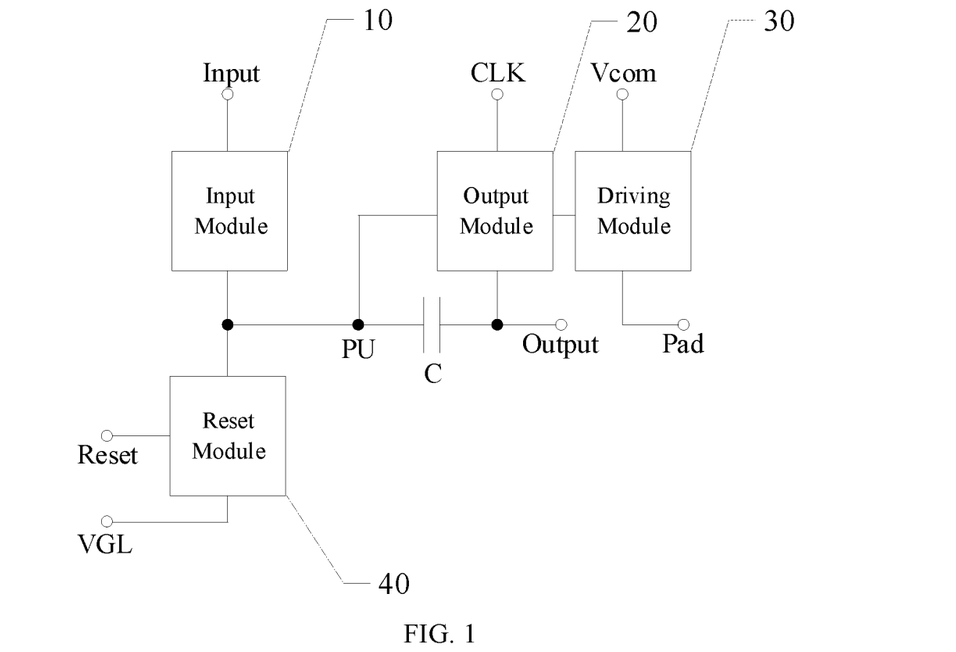
FIG. 1 is a block diagram showing a structure of an input control circuit according to an exemplary embodiment of the present disclosure.

In this regard, an input control circuit is first provided in the present exemplary embodiment. Referring to FIG. 1, the input control circuit according to the present exemplary embodiment may include an input module 10, an output module 20, a driving module 30, a reset module 40, and a bootstrap capacitor C. The input module 10 is connected to a signal input terminal and a pull up node PU and configured to transmit an input signal Input to the pull up node PU in response to the input signal Input. The output module 20 is connected to the pull up node PU, a clock signal terminal, and a signal output terminal, and is configured to transmit a clock signal CLK to the signal output terminal in response to a voltage signal at the pull up node PU. The driving module 30 is connected to the pull up node PU, a common signal terminal, and a common electrode block Pad, and is configured to transmit a common signal Vcom to the common electrode block Pad in response to a voltage signal at the pull up node PU. The reset module 40 is connected to the pull up node PU, a power signal terminal, and a reset signal terminal, and is configured to transmit a power signal VGL to the pull up node PU in response to a reset signal Reset. A bootstrap capacitor C is connected between the pull up node PU and the signal output terminal.

It should be noted that the input signal Input is a voltage signal at the signal input terminal, the clock signal CLK is a voltage signal at the clock signal terminal, the reset signal Reset is a voltage signal at the reset signal terminal, and the power signal VGL is a voltage signal at the power signal terminal.

It should be noted that the term "module" according to the present disclosure may be implemented as a circuitry/sub-circuit that is configured to perform corresponding operation. For example, the "input module" may include such a sub circuit, which, as a part of the input control circuit, is connected to a signal input terminal and a pull up node PU and configured to transmit an input signal Input to the pull up node PU in response to the input signal Input. Similarly, other "module" or the like in the present disclosure may be understood in a similar manner, and the description will not be repeated herein for the sake of brevity.

Through the input control circuit provided in the exemplary embodiment, on the one hand, under the control of the input signal Input, the signal at the pull up node PU can be pulled up for the first time, so that the driving module 30 transmits the common signal Vcom to the common electrode block Pad in a first saturated state. On the other hand, the signal at the pull up node PU can be further pulled up under the bootstrap effect of the bootstrap capacitor C, so that the driving module 30 can more easily transmit the common signal Vcom to the common electrode block Pad in a second saturated state with a higher opening degree. Therefore, the input control circuit provided in the present exemplary embodiment contributes to faster recovery of the fluctuation of the common signal, thereby overcoming the horizontal stripes occurring during the CT detection process and improving the CT detection efficiency.

Figure 2:
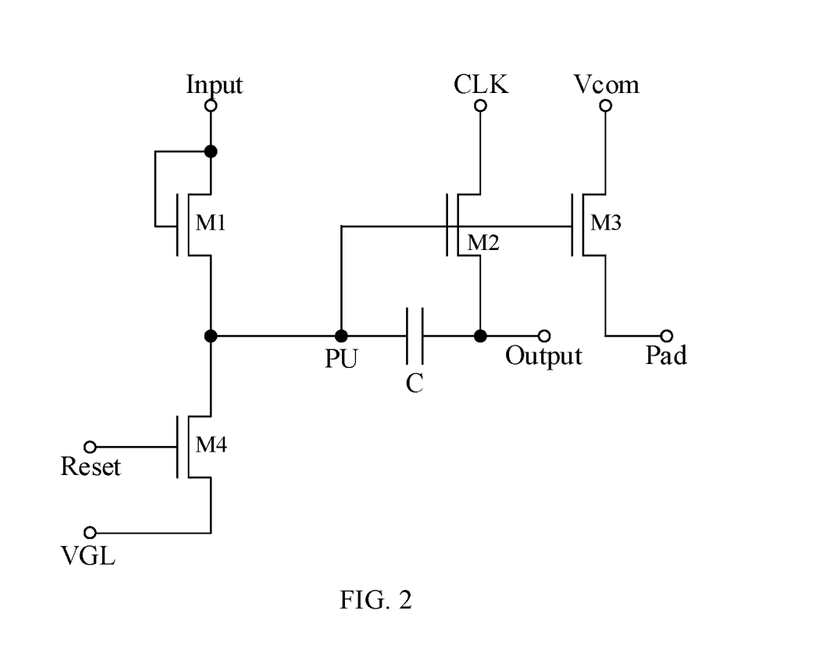
FIG. 2 is a schematic block diagram showing a structure of an input control circuit according to an exemplary embodiment of the present disclosure.

Next, the structure of the input control circuit will be described in detail with reference to FIG. 2.

In the present exemplary embodiment, the input module 10 may include a first switching element M1 having a control terminal and a first terminal both connected to the signal input terminal, and a second terminal connected to the pull up node PU.

The output module 20 may include a second switching element M2 having a control terminal connected to the pull up node PU, a first terminal connected to the clock signal terminal, and a second terminal connected to the signal output terminal.

The driving module 30 may include a third switching element M3 having a control terminal connected to the pull up node PU, a first terminal connected to the common signal terminal, and a second terminal connected to the common electrode block Pad.

The reset module 40 may include a fourth switching element M4 having a control terminal connected to the reset signal terminal, a first terminal connected to the power signal terminal, and a second terminal connected to the pull up node PU.

Figure 3:
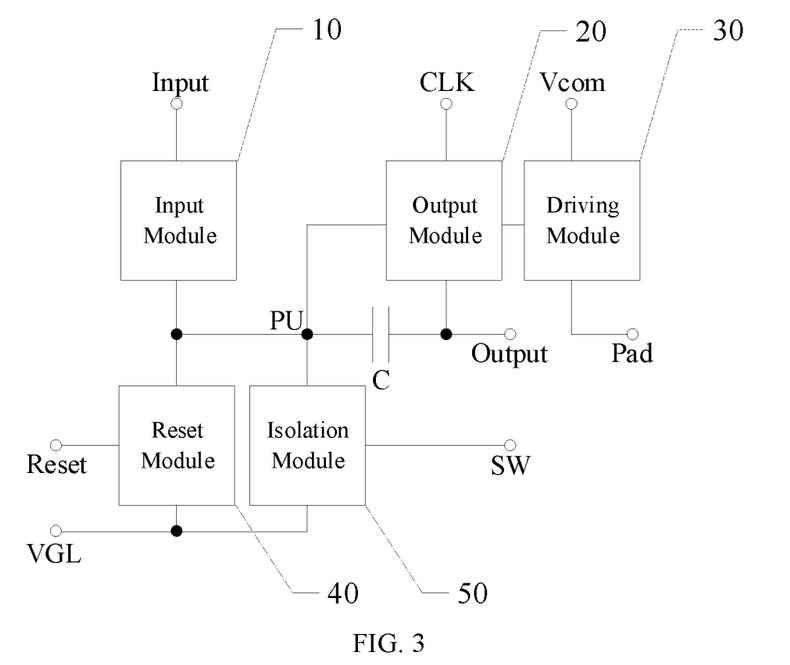
FIG. 3 is a block diagram showing a structure of an input control circuit according to an exemplary embodiment of the present disclosure.

In addition, referring to FIG. 3, in the present exemplary embodiment, the input control circuit may further include an isolation module 50. The isolation module 50 is connected to the isolation signal terminal, the power signal terminal, and the pull up node PU and configured to transmit the power signal VGL to the pull up node PU in response to the isolation signal.

Figure 4:
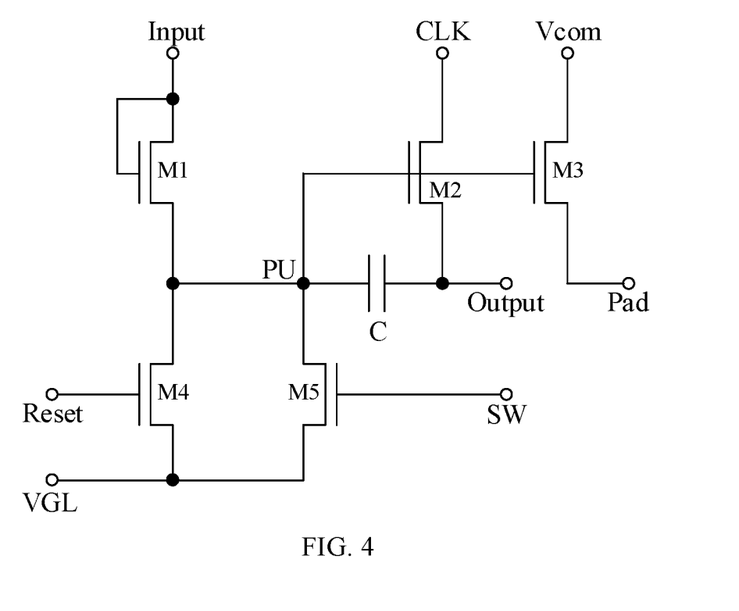
FIG. 4 is a schematic block diagram showing a structure of an input control circuit according to an exemplary embodiment of the present disclosure.

Referring to FIG. 4, the isolation module 50 may include a fifth switching element M5 having a control terminal connected to the isolation signal terminal, a first terminal connected to the power signal terminal, and a second terminal connected to the pull up node PU. Further description of the isolation module 50 will be described in detail in the input control device section below.

In the exemplary embodiment, all or individual ones of the switching elements may be Metal Oxide Semiconductor (MOS) field effect transistors, which may all be P-type MOS tubes or N-type MOS tubes. More specifically, the MOS transistor can be a thin film transistor. The gate electrode of the thin film transistor may be the control terminal, the source electrode may be the first terminal, and the drain electrode may be the second terminal. However, the source electrode of the thin film transistor may be the second terminal, and the drain electrode may be the first terminal mentioned above. In addition, it should be noted that for different types of transistors, the signal levels of the respective signal terminals can be adjusted and adapted accordingly.

Figure 5:
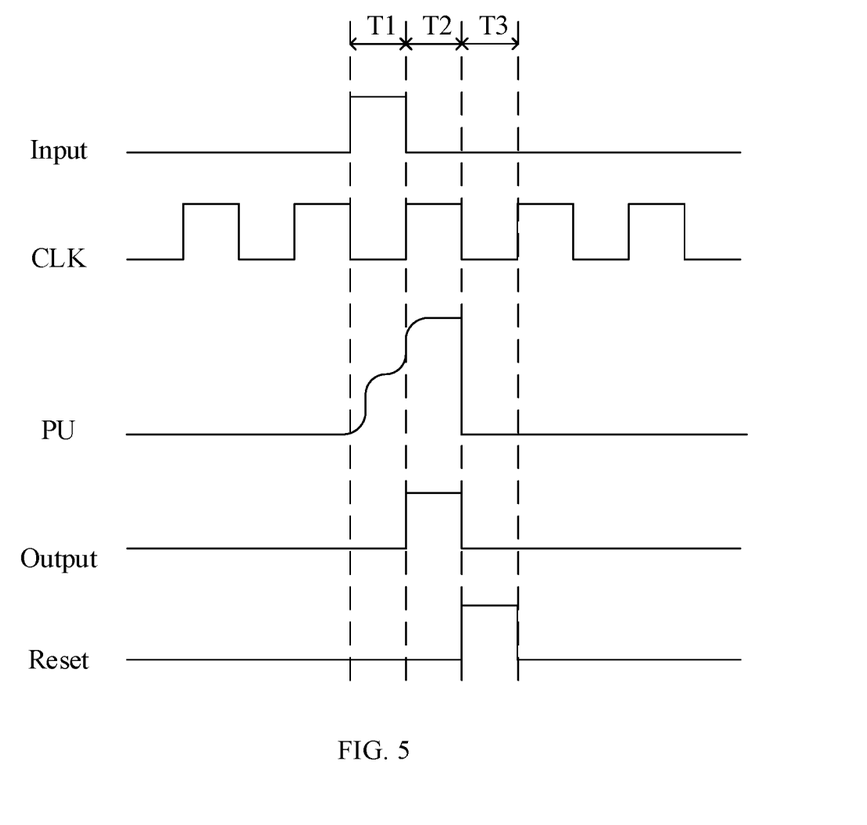
FIG. 5 is a timing signal diagram of an input control circuit according to an exemplary embodiment of the present disclosure.

Based on the above structure, taking all the switching elements as NMOSs and the power signal VGL of the power signal terminal as a low level signal as an example, the working process of the input control circuit in FIG. 4 is combined with the timing signal diagram shown in FIG. 5, and the input control method in the present disclosure will be specifically described.

In a charging stage (i.e., a T1 stage), the input signal Input at the signal input terminal is at a high level, and the first switching element M1 is turned on under the action of the input signal Input, to transmit the input signal Input to the pull up node PU to charge the bootstrap capacitor C. At the same time, the second switching element M2 and the third switching element M3 are respectively turned on under the action of the input signal Input transmitted to the pull up node PU, and the remaining switching elements are all in turned off states. The second switching element M2 transmits the clock signal CLK to the signal output terminal. Since the clock signal CLK is at a low level at this time, the output signal Output at the signal output terminal is also at a low level. The third switching element M3 transmits the common signal Vcom to the common electrode block Pad connected thereto. At this time, the third switching element M3 is in the first saturation state.

In a bootstrap stage (i.e., a T2 stage), the input signal Input at the signal input terminal is at a low level, and the first switching element M1 is turned off under the action of the input signal Input. However, under the action of the signal stored in the bootstrap capacitor C, the second switching elements M2 and the third switching element M3 are still in turned on states. The second switching element M2 transmits the clock signal CLK to the signal output terminal. Since the clock signal CLK is at a high level at this time, the output signal at the signal output terminal is also at a high level. Meanwhile, the clock signal CLK at the clock signal terminal is changed from a low level to a high level, due to the bootstrap effect of the bootstrap capacitor C, the signal at the pull up node PU is further pulled up, so that the third switching element M3 enters the second saturated state (i.e., a saturated state with a higher opening degree than that of the first saturated state) in which the common signal Vcom is transmitted to the common electrode block Pad against a smaller impedance, thereby facilitate faster recovery of the fluctuation of the common signal Vcom.

In a reset stage (i.e., a T3 stage), the input signal Input at the signal input terminal is at a low level, the first switching element M1 is turned off under the action of the input signal Input. The reset signal Reset at the reset signal terminal is at a high level, and the fourth switching element is M4 is turned on under the action of the reset signal Reset. The power signal VGL at the power signal terminal is transmitted to the pull up node PU through the fourth switching element M4 to reset the pull up node PU. After the pull up node PU is reset, the second switching device and the third switching device are in turned off states under the action of the low level signal at the pull up node PU, and the output signal at the signal output terminal is kept at a low level.

Figure 6:
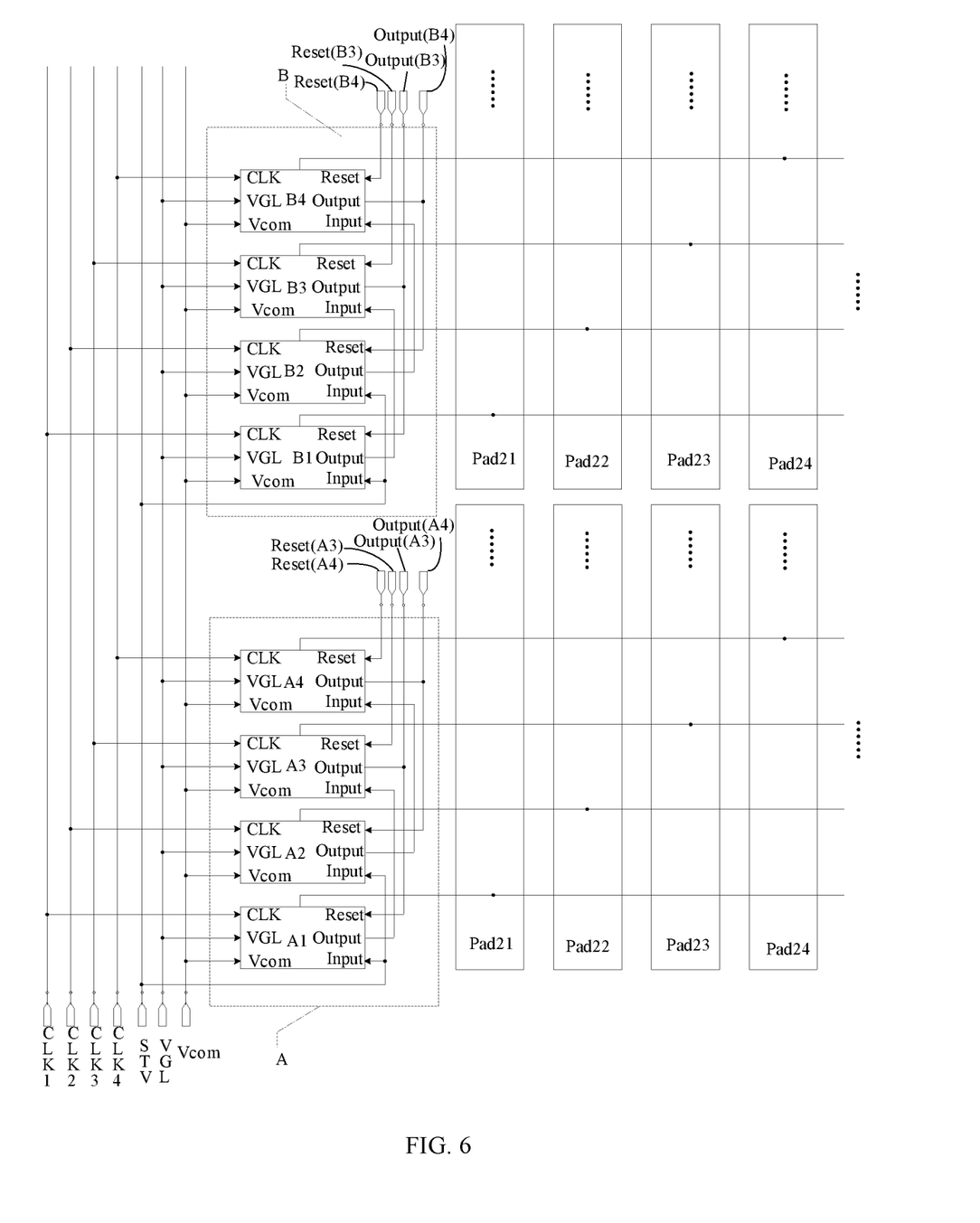
FIG. 6 is a schematic block diagram showing a structure of an input control device according to an exemplary embodiment of the present disclosure.

Further, an exemplary embodiment of the present disclosure also provides an input control device. Referring to FIG. 6, the input control device includes a plurality of input control circuit groups, and each of the input control circuit groups corresponds to a row of common electrode blocks. For example, as shown in FIG. 6, each of the input control circuit groups corresponds to a column of common electrode blocks, that is, the input control circuit group A corresponds to the common electrode blocks Pad11~Pad14, and the input control circuit group B corresponds to the common electrode blocks Pad21~Pad 24. However, it is easily understood by those skilled in the art that, depending on the arrangement direction of the gate scan lines, each of the input control circuit groups may correspond to a row of common electrode blocks, which is not particularly limited in the present exemplary embodiment.

Each of the input control circuit groups includes a plurality of cascaded input control circuits described above. The signal output terminal of the Nth stage input control circuit is connected to the signal input terminal of the (N+2)th stage input control circuit, and the signal output terminal of the (N+2)th stage input control circuit is connected to the reset signal terminal of the Nth stage input control circuit, where N is an integer and N≥1. For example, the signal output terminal of the first stage input control circuit is connected to the signal input terminal of the third stage input control circuit, and the signal output terminal of the third stage input control circuit is connected to the reset signal terminal of the first stage input control circuit. The signal output terminal of the second stage input control circuit is connected to the signal input terminal of the fourth stage input control circuit, and the signal output terminal of the fourth stage input control circuit is connected to the reset signal terminal of the second stage input control circuit. The signal output terminal of the third stage input control circuit is connected to the signal input terminal of the fifth stage input control circuit, and the signal output terminal of the fifth stage input control circuit is connected to the reset signal terminal of the third stage input control circuit, and so on so forth. The input signals of the first stage and the second stage input control circuits can be provided by a start signal STV, the clock signal terminal of the first stage input control circuit receives the clock signal CLK1, the clock signal terminal of the second stage input control circuit receives the clock signal CLK2, the clock signal terminal of the third stage input control circuit receives the clock signal CLK3, the clock signal terminal of the fourth stage input control circuit receives the clock signal CLK4, the clock signal terminal of the fifth stage input control circuit receives the clock signal CLK1, and the sixth clock signal terminal of the stage input control circuit receives the clock signal CLK2.

With continued reference to FIG. 6, each input control circuit in an input control circuit group is connected to the respective common electrode block in the column of common electrode blocks. Taking the input control circuit group A as an example, the input control circuits A1 to A4 output the common signals Vcom from left to right, and the common electrode blocks Pad11 to Pad14 corresponds to and receives the common signals Vcom from top to bottom. In addition, input control circuits in a group works simultaneously to ensure that the common electrode blocks of the same row receive the common signals Vcom at the same time.

Figure 7:
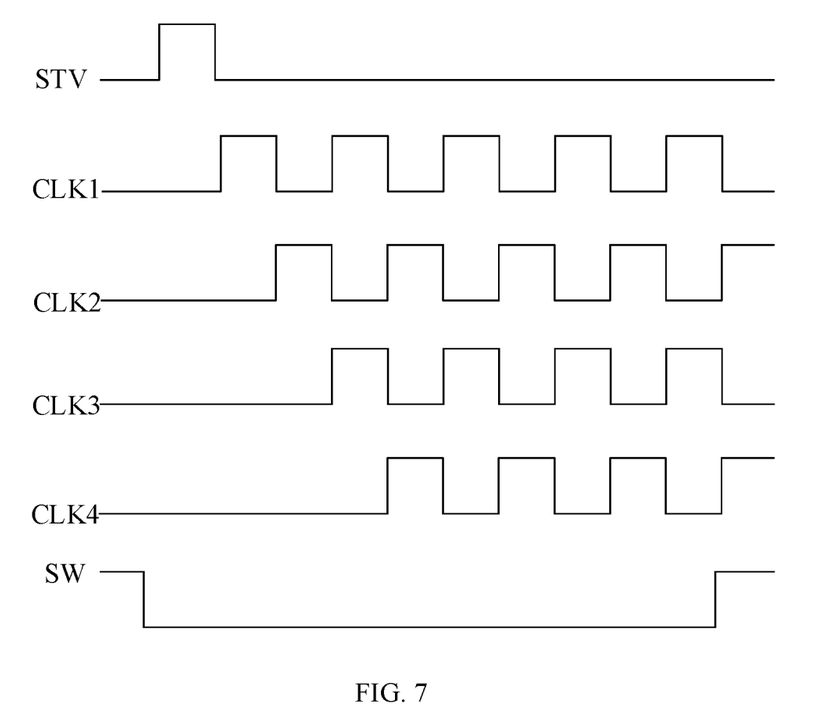
FIG. 7 schematically shows a timing signal diagram of an input control device according to an exemplary embodiment of the present disclosure.

The specific signal timing of the input control device can be as shown in FIG. 7. The active level of the clock signals CLK1~CLK4, that is, the wave width of a high level is not less than the total charging time of each row of pixels corresponding to one common electrode block Pad, that is, the total turned-on time of the switching transistors in each row of pixel circuits. For example, there are N rows of pixels under one common electrode block, that is, N rows of gate scan lines. Assuming that the charging time of each row of pixels is 1H, the wave width of the active level of the clock signals CLK1~CLK4 needs to be greater than a time period of NH, for example, each being a time period of (N+2)H, to ensure that the common signals of all common electrode blocks Pads can be compensated for during the corresponding pixel charging time, thereby overcoming display defects.

Further, with continued reference to FIG. 7, during the operation of the input control device, the isolation signal of the isolated signal terminal is at a low level, and the fifth switching element M5 is in a turned off state. After the operation of the input control device is completed, for example, during touch detection, the isolation signal at the isolated signal terminal is at a high level, and the fifth switching element M5 is in a turned on state. So the power signal VGL can be transmitted to the pull up node PU. The voltage of the pull up node PU is kept at a low level, thereby achieving the turning off of the third switching element M3. Thus, it can ensure electrical isolation between the common signal terminal and the common electrode block, and prevent affecting the normal operation of the touch detection.

However, in the present exemplary embodiment, the signal terminal connection manner of the cascading structure of the input control device is not limited thereto, and may be adapted according to actual conditions, which is not specifically limited herein.

Further, an exemplary embodiment of the present disclosure provides a display panel including a plurality of common electrode blocks arranged in an array and the above-mentioned input control circuit group. Each of the input control circuit groups corresponds to a row of the common electrode blocks, and each input control circuit in the input control circuit group is respectively connected to each of the common electrode blocks of the row.

In the exemplary embodiment, the display panel may be an LCD display panel, an OLED display panel, a PLED (Polymer Light-Emitting Diode) display panel, a PDP (Plasma Display Panel), or the like. No specific restrictions are imposed on the application of the display panel.

It should be noted that the specific details of the input control device and each module unit in the display panel have been described in detail in the corresponding input control circuit, which will not be repeated herein.

An exemplary embodiment also provides a display device, including the above-described display panel. The display device may include any product or component having a display function, such as a mobile phone, a tablet computer, a television, a notebook computer, a digital photo frame, a navigator, and the like.

In the input control circuit according to the exemplary embodiment, on one hand, under the control of the input signal, the signal at the pull up node can be pulled up for the first time so that the driving module transmits the common signal to the common electrode block in a first saturated state. On the other hand, the signal at the pull up node can be further pulled up under the bootstrap effect of the bootstrap capacitor, so that the driving module can more easily transmit the common signal to the common electrode block in a second saturated state with a higher opening degree. Therefore, the input control circuit provided in the present exemplary embodiment contributes to faster recovery of the fluctuation of the common signal, thereby overcoming the horizontal stripes occurring during the CT detection process and improving the CT detection efficiency.

It should be noted that although several modules or units of a device for action execution are mentioned in the detailed description above, such division is not mandatory. Indeed, in accordance with embodiments of the present disclosure, the features and functions of two or more modules or units described above may be embodied in one module or unit. Conversely, the features and functions of one of the modules or units described above may be further divided into multiple modules or units.

In addition, although the various steps of the method of the present disclosure are described in a particular order in the drawings, this is not required or implied that the steps must be performed in the specific order, or all the steps shown must be performed to achieve the desired result. Additionally or alternatively, certain steps may be omitted, multiple steps may be combined into one step, and/or one step may be decomposed into multiple steps and the like.

Through the description of the above embodiments, those skilled in the art will readily understand that the exemplary embodiments described herein may be implemented by software or by software in combination with necessary hardware. Therefore, the technical solution according to an embodiment of the present disclosure may be embodied in the form of a software product, which may be stored in a non-volatile storage medium (which may be a CD-ROM, a USB flash drive, a mobile hard disk, etc.) or on a network. A number of instructions are included to cause a computing device (which may be a personal computer, a server, a mobile terminal, or a network device, etc.) to perform a method in accordance with the embodiment of the present disclosure.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

What is claimed is:

1. An input control circuit, comprising:
   an input sub circuit connected to a signal input terminal and a pull up node, and configured to transmit an input signal to the pull up node in response to the input signal;
   an output sub circuit connected to the pull up node, a clock signal terminal, and a signal output terminal, and configured to transmit a clock signal to the signal output terminal in response to a voltage signal at the pull up node;
   a driving sub circuit connected to the pull up node, a common signal terminal, and a common electrode block, and configured to transmit a common signal to the common electrode block in response to the voltage signal at the pull up node;
   a reset sub circuit connected to the pull up node, a power signal terminal, and a reset signal terminal, and configured to transmit a power signal to the pull up node in response to a reset signal; and
   a bootstrap capacitor connected between the pull up node and the signal output terminal,
   wherein the output sub circuit and driving sub circuit are configured such that transmission of the clock signal to the signal output terminal in response to the voltage signal at the pull up node and transmission of the common signal to the common electrode block in response to the voltage signal at the pull up node are performed simultaneously.

2. The input control circuit of claim 1, wherein the input sub circuit comprises: a first switching element having a control terminal and a first terminal both connected to the signal input terminal, and a second terminal connected to the pull up node.

3. The input control circuit of claim 1, wherein the output sub circuit comprises: a second switching element having a control terminal connected to the pull up node, a first terminal connected to the clock signal terminal, and a second terminal connected to the signal output terminal.

4. The input control circuit of claim 1, wherein the driving sub circuit comprises: a third switching element having a control terminal connected to the pull up node, a first terminal connected to the common signal terminal, and a second terminal connected to the common electrode block.

5. The input control circuit of claim 1, wherein the reset sub circuit comprises: a fourth switching element having a control terminal connected to the reset signal terminal, a first terminal connected to the power signal terminal, and a second terminal connected to the pull up node.

6. The input control circuit of claim 1, further comprising: an isolation sub circuit connected to an isolation signal terminal, the power signal terminal, and the pull up node, and configured to transmit the power signal to the pull up node in response to an isolation signal.

7. The input control circuit of claim 6, wherein the isolation sub circuit comprises: a fifth switching element having a control terminal connected to the isolated signal terminal, a first terminal connected to the power signal terminal, and a second terminal connected to the pull up node.

8. The input control circuit of claim 1, further comprising:
   a first switching element having a control terminal and a first terminal both connected to the signal input terminal, and a second terminal connected to the pull up node;
   a second switching element having a control terminal connected to the pull up node, a first terminal connected to the clock signal terminal, and a second terminal connected to the signal output terminal;
   a third switching element having a control terminal connected to the pull up node, a first terminal connected to the common signal terminal, and a second terminal connected to the common electrode block; and
   a fourth switching element having a control terminal connected to the reset signal terminal, a first terminal connected to the power signal terminal, and a second terminal connected to the pull up node.

9. The input control circuit of claim 8, further comprising: a fifth switching element having a control terminal connected to the isolated signal terminal, a first terminal connected to the power signal terminal, and a second terminal connected to the pull up node.

10. An input control method applied to an input control circuit, the method comprising:
    providing the input control circuit, comprising:
       an input sub circuit connected to a signal input terminal and a pull up node, and configured to transmit an input signal to the pull up node in response to the input signal;
       an output sub circuit connected to the pull up node, a clock signal terminal, and a signal output terminal, and configured to transmit a clock signal to the signal output terminal in response to a voltage signal at the pull up node;
       a driving sub circuit connected to the pull up node, a common signal terminal, and a common electrode block, and configured to transmit a common signal to the common electrode block in response to the voltage signal at the pull up node;
       a reset sub circuit connected to the pull up node, a power signal terminal, and a reset signal terminal, and configured to transmit a power signal to the pull up node in response to a reset signal; and
       a bootstrap capacitor connected between the pull up node and the signal output terminal;
    controlling the input sub circuit to transmit the input signal to the pull up node in response to the input signal, thereby simultaneously causing the output sub circuit to transmit the clock signal to the signal output terminal and causing the driving sub circuit to transmit the common signal to the common electrode block in a first saturated state;
    pulling up the signal at the pull up node under a bootstrap effect of the bootstrap capacitor, and causing the driving sub circuit to transmit the common signal to the common electrode block in a second saturated state; and controlling the reset sub circuit to transmit the power signal to the pull up node to reset the pull up node in response to the reset signal.

11. A system, comprising:

an input control device, comprising a plurality of input control circuit groups, each of the input control circuit groups comprising a plurality of cascaded input control circuits, each of the plurality of cascaded input control circuits comprising:

- an input sub circuit connected to a signal input terminal and a pull up node, and configured to transmit an input signal to the pull up node in response to the input signal;
- an output sub circuit connected to the pull up node, a clock signal terminal, and a signal output terminal, and configured to transmit a clock signal to the signal output terminal in response to a voltage signal at the pull up node;
- a driving sub circuit connected to the pull up node, a common signal terminal, and a common electrode block, and configured to transmit a common signal to the common electrode block in response to the voltage signal at the pull up node;
- a reset sub circuit connected to the pull up node, a power signal terminal, and a reset signal terminal, and configured to transmit a power signal to the pull up node in response to a reset signal; and
- a bootstrap capacitor connected between the pull up node and the signal output terminal;

wherein the output sub circuit and driving sub circuit are configured such that transmission of the clock signal to the signal output terminal in response to the voltage signal at the pull up node and transmission of the common signal to the common electrode block in response to the voltage signal at the pull up node are performed simultaneously; and wherein the signal output terminal of a Nth stage input control circuit is connected to the signal input terminal of a (N+2)th stage input control circuit, and the signal output terminal of the(N+2)th stage input control circuit is connected to the reset signal terminal of the Nth stage input control circuit; where N is an integer and N≥1.

12. The system of claim 11, further comprising:

a display panel, comprising the input control device; and a plurality of common electrode blocks arranged in an array, wherein each of the input control circuit groups corresponds to a row of the common electrode blocks, and each input control circuit in the input control circuit group is respectively connected to each of the common electrode blocks of the row.

* * * * *